(12) United States Patent
Kanebako et al.

(10) Patent No.: US 6,320,290 B1
(45) Date of Patent: Nov. 20, 2001

(54) MAGNETIC LEVITATED MOTOR

(75) Inventors: Hideki Kanebako, Nagano; Yohji Okada, Ibaraki, both of (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/640,650

(22) Filed: Aug. 18, 2000

(30) Foreign Application Priority Data

Sep. 1, 1999 (JP) .................................................. 11-247708

(51) Int. Cl.$^7$ ...................................................... H02K 7/09
(52) U.S. Cl. .............................................................. 310/90.5
(58) Field of Search .................................. 310/90.5, 258, 310/179; 384/100, 108; 318/721

(56) References Cited

U.S. PATENT DOCUMENTS

| | | | | |
|---|---|---|---|---|
| 4,245,869 | * | 1/1981 | Scheffer et al. ........................ | 308/10 |
| 5,111,102 | * | 5/1992 | Meeks ................................. | 310/90.5 |
| 5,160,877 | * | 11/1992 | Fujiwara et al. ................. | 318/568.21 |
| 6,130,494 | * | 10/2000 | Schob .................................. | 310/90.5 |
| 6,147,425 | * | 11/2000 | Ueyama et al. .................... | 310/90.5 |
| 6,166,469 | * | 12/2000 | Osama et al. ........................ | 310/90.5 |
| 6,194,800 | * | 2/2001 | Maruyama et al. ................. | 310/90.5 |
| 6,208,051 | * | 3/2001 | Ando ................................... | 310/90.5 |

FOREIGN PATENT DOCUMENTS 6-269144   9/1994 (JP) ................................. H02K/7/09

* cited by examiner

*Primary Examiner*—Nestor Ramirez
*Assistant Examiner*—Thanh Lam
(74) *Attorney, Agent, or Firm*—Sughrue, Mion, Zinn, Macpeak & Seas, PLLC

(57) ABSTRACT

A rotor includes a rotor magnet magnetized to have a multiple of magnetic poles. A stator, while confronting with the rotor, includes a rotor driving coil set for generating a rotational torque in the rotor, and a bearing coil set for generating a bearing force having a direction perpendicular to the rotational axis direction of the rotor. The number of magnetic poles of the rotor magnet is eight. The number of coils of the bearing coil set of the stator is six. Displacement sensor is provided for detecting a displacement of the rotor, in a direction perpendicular to the rotational axis of the rotor. The rotor is rotated by the rotor driving coil set. Currents flowing in the bearing coils are controlled in accordance with output of the displacement sensor to hold the rotational axis of the rotor at a predetermined position.

15 Claims, 8 Drawing Sheets

MAGNETIC LEVITATED MOTOR

BACKGROUND OF THE INVENTION

The present invention relates to a magnetic levitated motor in which a rotor is magnetically supported in non-contact and rotatable manner.

A magnetic bearing has been used for supporting a rotary member in non-contact manner. A radial type magnetic levitated motor is proposed which functions as a magnetic bearing and a motor. The magnetic levitation motor is advantageous in that it is capable of simultaneously exercising the rotor torque generation and the position control, but it is disadvantageous in that the stator structure and the control circuit are complex.

A magnetic levitated motor disclosed in Japanese Patent Publication No. 6-269144A includes a stator having magnetic poles formed on the inner face thereof, each magnetic pole being wound by a single pole coil a rotor made of permanent magnet, the rotor having M number of magnetic poles, which are confronted with the inner wall of the stator with a gap therebetween, and a controller for feeding current for generating a revolving magnetic field having (M±2) number of poles along the inner face of the stator and current for rotating the rotor to the coils of the stator, wherein a magnetic levitational force is developed through the magnetic interaction between the revolving magnetic field having (M±2) number of poles along the inner face of the stator and the permanent magnet of the rotor. The current for rotating the rotor is superposed on the current for developing the levitational force and the resultant is fed to the stator. As a result, the rotor is magnetically levitated and rotated.

The related magnetic levitated motor requires a complicated magnetic flux distribution for the stator. Therefore, its structure is complex, and complicated levitational force control is required. Accordingly, there is a limit in increasing the motor speed. Further its face is covered with the permanent magnet, so that a levitational force is weak, and its efficiency is unsatisfactory.

SUMMARY OF THE INVENTION

Accordingly, the present invention has an object to provide a magnetic levitated motor which is simple in structure, and is made, by simple control, free from the mutual influence between the levitational force control and the rotational torque control, and reduced in axial length, and is high in its efficiency.

In order to achieve the above object, according to the present invention, there is provided a magnetic levitated motor comprising:

at least one rotor provided with a rotor magnet magnetized so as to have eight magnetic poles;

at least one stator confronted with the rotor while rotatably supporting the rotor with magnetic force, the stator provided with rotor driving coils confronted with the rotor magnet to generate a rotational torque in the rotor to rotate the rotor, and six bearing coils for generating a bearing force in a direction perpendicular to the rotational axis of the rotor; and a displacement sensor for detecting displacement of the rotor with respect to a plane which is perpendicular to the rotational axis of the rotor, wherein currents flowing in the bearing coils are controlled in accordance with output of the displacement sensor to keep the rotational axis of the rotor at a predetermined position.

In this configuration, since the number of magnetic poles of the rotor magnet is eight, and the number of the coils of the bearing coil set is six, the rotation and bearing coil sets may be formed to have the same configuration, and disposed at the same location while being laid one on the other. Therefore, the stator is simplified in construction. The probability that the magnetic levitational force control mutually influences the rotational torque control can be reduced.

Since the rotation and bearing coil sets may be formed to have the same configuration, the rotor driving coil set and the bearing coil set are integrated into a single common coil set, and bearing force generating current and rotational torque generation current, while being superposed one on the other, are fed to the single common coil.

The stator and the rotor may be arranged so as to constitute a planar confronting type motor. Preferably, two stators are provided such that two planar rotor magnets are arranged along the rotational axis thereof in between. The thus constructed motor is capable of producing larger levitational force and rotational torque, and performing the space four axes control except the position control in the rotational axis direction.

Alternatively, the stator and rotor may be arranged so as to constitute a cylindrical confronting type motor. Preferably, a pair of cylindrical rotor-stator sets are arranged along a common rotational axis of the rotors. The thus constructed motor is also capable of producing larger levitational force and rotational torque, and performing the space four axes control except the position control in the rotational axis direction.

DETAILED DESCRIPTION OF THE PREFERRED EMBODIMENTS

Magnetic levitated motors according to the preferred embodiments of the present invention will be described with reference to the accompanying drawings.

Figure 1:
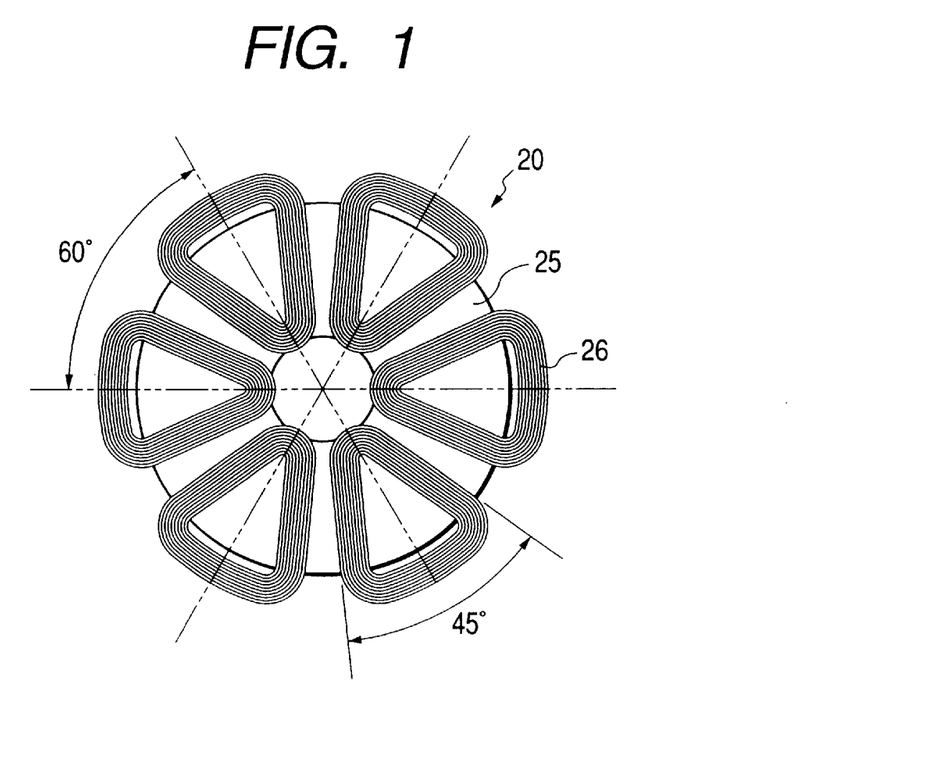
FIG. 1 is a plan view showing a stator of a magnetic levitated motor according to a first embodiment of the present invention.
Figure 2A:
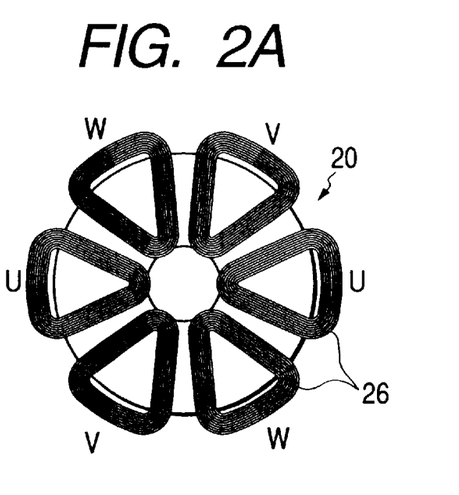
FIGS. 2A and 2B are plan views respectively showing a set of rotor driving coils and a set of bearing coils of the motor.
Figure 2B:
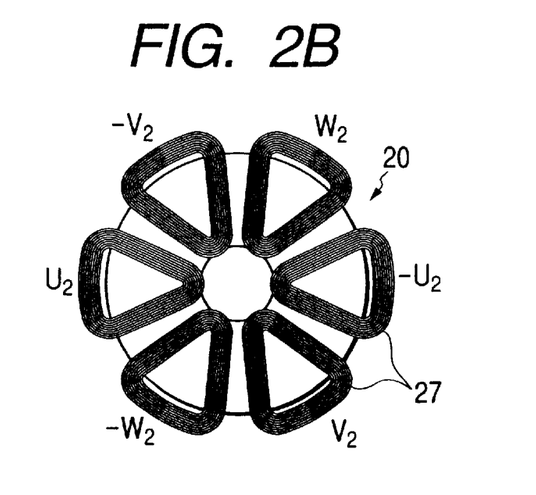

FIGS. 1 and 2 show a magnetic levitated motor according to a first embodiment of the present invention. FIG. 1 is a plan view showing a stator 20 of the magnetic levitated motor. FIG. 2A is a plan views showing a set of rotor driving coils 26 disposed in the upper part of the stator, and FIG. 2B is a plan view showing a set of bearing coils 27 disposed in the lower part thereof. The rotor driving coil set 26 has the same configuration as of the bearing coil set 27 when viewed in plan. When the rotor driving coil set 26 is placed on the bearing coil set 27, those coils will look like sets of a single coil.

Figure 3:
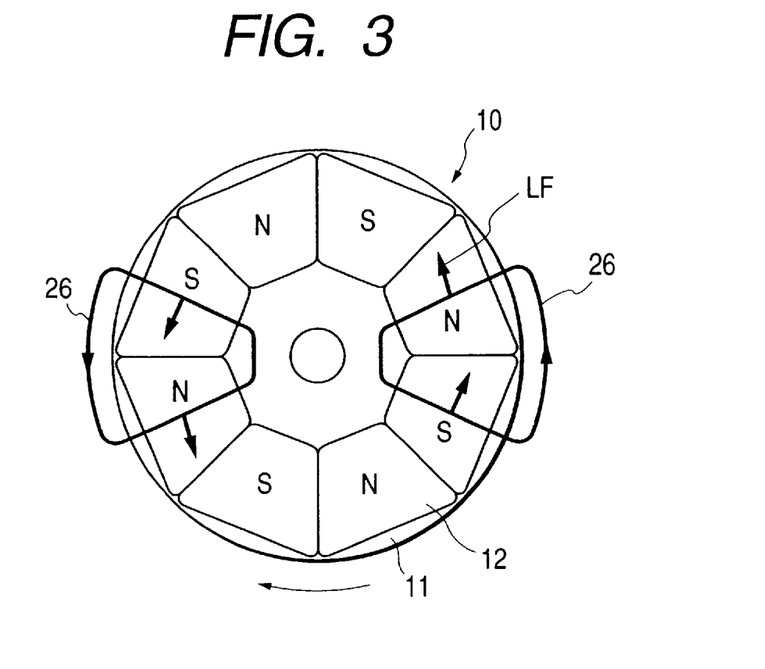
FIG. 3 is a diagram for explaining a principle for generating a rotational torque in the motor.

FIG. 3 is a diagram for explaining a principle for generating a rotational torque through an interactive action between the rotor driving coil set 26 and a rotor magnet 12, in connection with FIG. 2A. Currents, which are in phase, are fed to the two coils which are oppositely located in the coil arrangement of the rotor driving coil set 26 as shown in FIG. 3. Lorentz forces are generated in the two coils 26. Those forces are opposite to each other or in a circumferential direction of a rotor. As a result, a rotational torque is generated.

Figure 4:
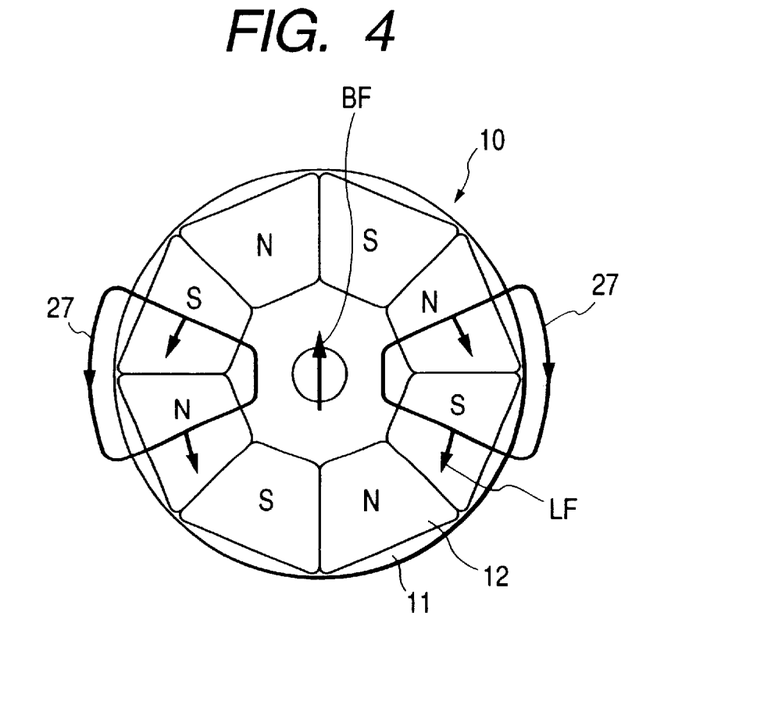
FIG. 4 is a diagram for explaining a principle of generating a levitational force in the motor.

FIG. 4 is a diagram for explaining a principle of generating a levitational force (bearing force) by an interaction between the bearing coil set 27 and the rotor magnet 12. Currents are fed to the two coils oppositely located in the coil arrangement of the bearing coil set 27 as shown in FIG. 4 so that the two coils cooperatively produce a drive force of a radial direction. Lorentz forces LF are generated in the same direction (downward direction in FIG. 4), so that a levitational force BF is generated in the radial direction.

In FIGS. 1 through 4, the stator 20 includes the rotor driving coil set 26 for generating a rotational torque, and the bearing coil set 27 for generating a bearing force in the radial direction of the rotor 10. The rotor driving coil set 26 consists of six coils each being triangular in shape. The same thing is true for the bearing coil set 27. Those rotor driving coil sets are equal in coil arrangement and size, and are placed on a disc as a stator core while being layered one on the other. The rotor 10 includes a back yoke 11 shaped like a disc, and a rotor magnet 12 secured to the upper face of the back yoke 11. The rotor magnet 12 is magnetized to have eight poles arrayed in the circumferential direction, as shown in FIG. 3. The rotor 10 and the stator 20 shown in FIG. 1 are disposed in state that their faces confront with each other, and the rotor 10 is supported by a thrust bearing member, whereby a face confronting type motor is formed.

Figure 5:
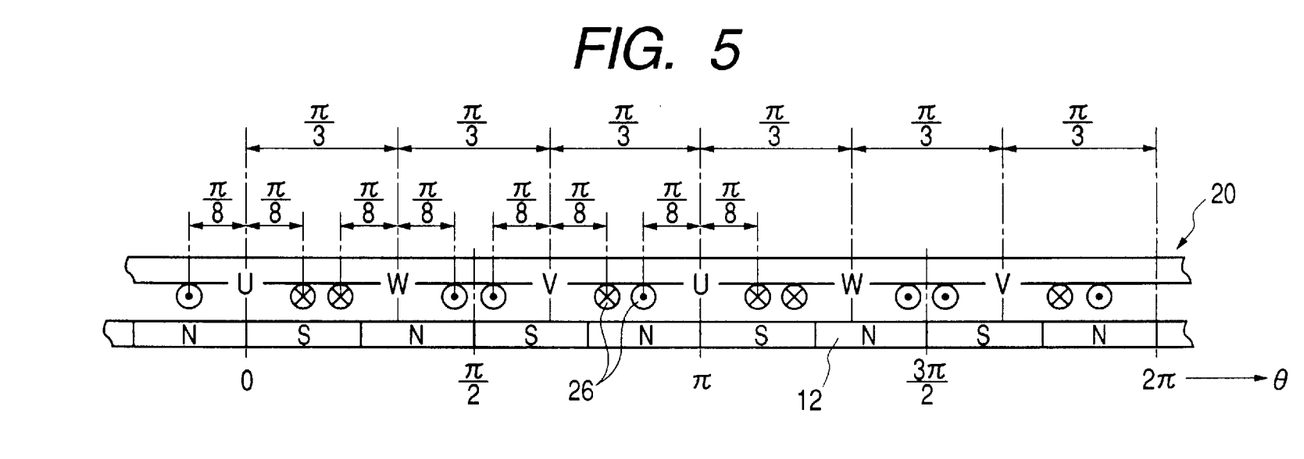
FIG. 5 is a developed diagram for explaining the principle of generating a rotational torque in the motor.
Figure 6:
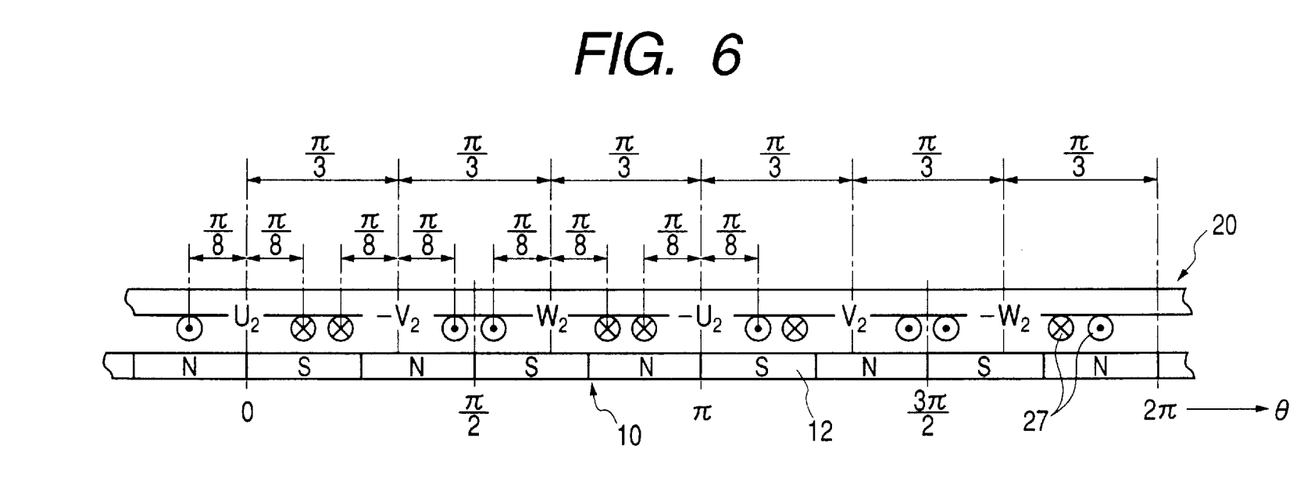
FIG. 6 is a developed diagram for explaining the principle of generating a levitational force in the motor.

FIGS. 5 and 6 show positional relationships between the two coil sets 26 and 27 and the magnetic poles of the rotor magnet 12 for one turn by developing the magnetic levitated motor shown in FIGS. 1 and 2 in the radial direction. As already stated, the rotation and bearing coil sets 26 and 27 of U, V and W phases are disposed on the stator core. The rotor magnet 12 with eight magnetic poles is mounted on the rotor 10. A magnetic flux $B_g$ which sinusoidally varies and is mathematically given by the following expression (1), is generated in an air gap between the rotor 10 and the stator 20.

$$B_g = -B \sin(\omega t + 4t) \quad (1)$$

Description will be given about a principle of generating a rotational torque in the above-mentioned embodiment. A coil arrangement of the rotor driving coil set 26 for generating a rotational torque is shown in FIG. 5. As shown in FIGS. 2A and 5, six concentrated coils of U-, W- and V-phases are arranged on the stator while being spaced every $\pi/3$. The going and returning wires of each phase coil, i.e., the coil portions radially extending and intersecting the magnet, are spaced $\pi/4$ so as to generate a maximum torque. 3-phase currents given by the following expression (2) are fed to the coils of those phases.

$$I_U = A\cos(\omega t + \varphi) \quad (2)$$
$$I_V = A\cos\left(\omega t + \frac{2}{3}\pi + \varphi\right)$$
$$I_W = A\cos\left(\omega t + \frac{4}{3}\pi + \varphi\right)$$

The variables in the above equations are:

B: amplitude of magnetic flux density of magnet
$\omega$: angular frequency
t: time
$\theta$: rotating coordinates fixed on the stator
A: amplitude of current
$\phi$: phase difference between magnetic flux and rotor
$I_m$: entire effective length of bearing coil
r: radius of rotor The motor current flowing along the circumference may be given by an expression (3) by using the Dirac delta function.

$$i_1 = I_U\left[\delta\left(\theta + \frac{\pi}{8}\right) - \delta\left(\theta - \frac{\pi}{8}\right)\right] + I_W\left[\delta\left(\theta - \frac{5}{24}\pi\right) - \delta\left(\theta - \frac{11}{24}\pi\right)\right] + I_V\left[\delta\left(\theta - \frac{13}{24}\pi\right) - \delta\left(\theta - \frac{19}{24}\pi\right)\right] \quad (3)$$

A rotational torque generated by this current is developed according to Fleming's rule and given by an expression (4). The torque was calculated on the assumption that the same current will flow in the remaining half period, and it is two times as large as that for the half period.

$$T = 2rl_m \int_{-\frac{\pi}{8}}^{\frac{7}{8}\pi} B_g i_1 d\theta \quad (4)$$

$$= 2rl_m AB[2\cos(\omega t + \varphi)\cos\omega t -$$

$$2\cos\left(\omega t + \frac{3}{4}\pi + \varphi\right)\cos\left(\omega t + \frac{\pi}{3}\right) -$$

$$2\cos\left(\omega t + \frac{2}{3}\pi + \varphi\right)\cos\left(\omega t + \frac{\pi}{6}\right)]$$

$$= 6rl_m AB\cos\varphi$$

As see from the above expression, the motor of the embodiment is capable of producing a fixed rotational torque independently of a position of the rotor and time.

Further, the motor can perform the following motor controls by the utilization of the phase φ of the 3-phase current, as the ordinary synchronous motor.

φ=0°: servomotor control by the amplitude A
φ=90°: synchronous motor having no load
0°<φ<90°: synchronous motor having load In the embodiment, the number of the magnetic poles of the rotor magnet 12 is 8, but the number of the coils of the stator corresponds to the case of the four magnetic poles. Nevertheless, the magnetic levitated motor of the embodiment can perform the controls as the PM synchronous motor does. The length of the coil end is considerably short, and suffers from less ohmic loss. A relationship between the electric angular frequency ω and the mechanical frequency $\omega_m$ is given by the following expression (5) as in the case of the 8-pole motor.

$$\omega = \frac{P\omega_m}{2} \text{ where } P = 8 \quad (5)$$

Next, a levitational force control in the above-mentioned embodiment will be described. A coil arrangement of the bearing coil set 27 for generating a levitational force in the radial direction is shown in FIG. 6. The bearing coil set 27 and the rotor driving coil set 26 are disposed at the same location while being laid one on the other, thereby forming a 3-phase/2-pole coil arrangement. Current to be fed to the bearing coil set 27 is given by an expression (6).

$$I_{U2} = C\cos(\omega t + \phi) \quad (6)$$

$$I_{V2} = C\cos\left(\omega t + \frac{2}{3}\pi + \phi\right)$$

$$I_{W2} = C\cos\left(\omega t + \frac{4}{3}\pi + \phi\right)$$

Accordingly, a current distribution for generating a levitational force in the radial direction is given by the following expression (7).

$$i_2 = I_{U2}\left[\delta\left(\theta + \frac{\pi}{8}\right) - \delta\left(\theta - \frac{\pi}{8}\right) - \delta\left(\theta - \frac{7}{24}\pi\right) - \delta\left(\theta - \frac{9}{24}\pi\right)\right] + \quad (7)$$

$$I_{V2}\left[-\delta\left(\theta - \frac{5}{24}\pi\right) + \delta\left(\theta - \frac{11}{24}\pi\right) + \delta\left(\theta - \frac{29}{24}\pi\right) - \right.$$

$$\left.\delta\left(\theta - \frac{35}{24}\pi\right)\right] + I_{W2}\left[\delta\left(\theta - \frac{13}{24}\pi\right) - \delta\left(\theta - \frac{19}{24}\pi\right) - \right.$$

$$\left.\delta\left(\theta - \frac{37}{24}\pi\right) + \delta\left(\theta - \frac{43}{24}\pi\right)\right]$$

Variable in the above expression are defined as follows:
B: amplitude of magnetic flux density of magnet
ω: angular frequency
t: time
θ: rotating coordinates fixed on the stator
C: amplitude of radial direction control current for rotor
θ: phase difference of levitational coil current
$I_b$: entire effective length of bearing coil In the figure, "y" represents a vertical upward direction with respect to the base of the motor, and "x" represents a horizontal lateral direction.

The gap flux $B_g$ is given by the expression (1), and a vertical force $F_y$ acting in the vertical upward direction, which is caused by the current for generating the levitational force, is given by an expression (8).

$$F_y = l_b \int_{-\frac{\pi}{8}}^{\frac{15}{8}\pi} B_g i_2 \cos\theta d\theta \quad (8)$$

$$= Bl_b C\{2[\cos\phi + \cos(2\omega t + \phi)]\cos\frac{\pi}{8} +$$

$$\left[\cos\left(\frac{\pi}{3} + \phi\right) - \cos(2\omega t + \phi)\right]\left(\cos\frac{5}{24}\pi + \cos\frac{11}{24}\pi\right) -$$

$$\cos(2\omega t + \phi) - \sin\left(\frac{\pi}{6} + \phi\right)\left(\cos\frac{5}{24}\pi + \cos\frac{11}{24}\pi\right)\}$$

$$= \frac{3\sqrt{2 + \sqrt{2}}}{2} Bl_b C\cos\phi$$

A horizontal force $F_x$ acting in the lateral direction is given by an expression (9).

$$F_x = l_b \int_{-\frac{\pi}{8}}^{\frac{15}{8}\pi} B_g i_2 \sin\theta d\theta \quad (9)$$

$$= Bl_b C + \left[\cos\left(\frac{\pi}{3} + \phi\right) - \cos(2\omega t + \phi)\right]\left(\sin\frac{5}{24}\pi + \right.$$

$$\left.\sin\frac{11}{24}\pi\right) + \cos(2\omega t + \phi) - \sin\left(\frac{\pi}{6} + \phi\right)]$$

$$\left(\sin\frac{5}{24}\pi + \sin\frac{11}{24}\pi\right)\}$$

$$= -\frac{3\sqrt{2 + \sqrt{2}}}{2} Bl_b C\sin\phi$$

As seen from the foregoing description, the levitational force may be controlled while independently of a rotation angle of the rotor. Further, it does not interferes with the rotational torque control, and is capable of generating a control force in every direction on the circumference.

In the embodiment mentioned above, the rotor driving coil set and the bearing coil set are separately provided. As recalled, in the embodiment, the rotor driving coil set and the bearing coil set are equal in configuration and size, and disposed at the same location while being laid one on the other. Therefore, those separated coil sets, i.e., the rotor driving coil set and the bearing coil set, may be integrated into a single common coil set. Or the normal rotor driving coil set may be used. In this case, the bearing force generating current is superposed on the rotational torque generation current, and the composite current is fed to the single coil set last mentioned. The alternative is capable of producing the rotational torque and the levitational force. Thus, the magnetic levitated motor is simplified in construction by the integrating of the coil sets.

Figure 7:
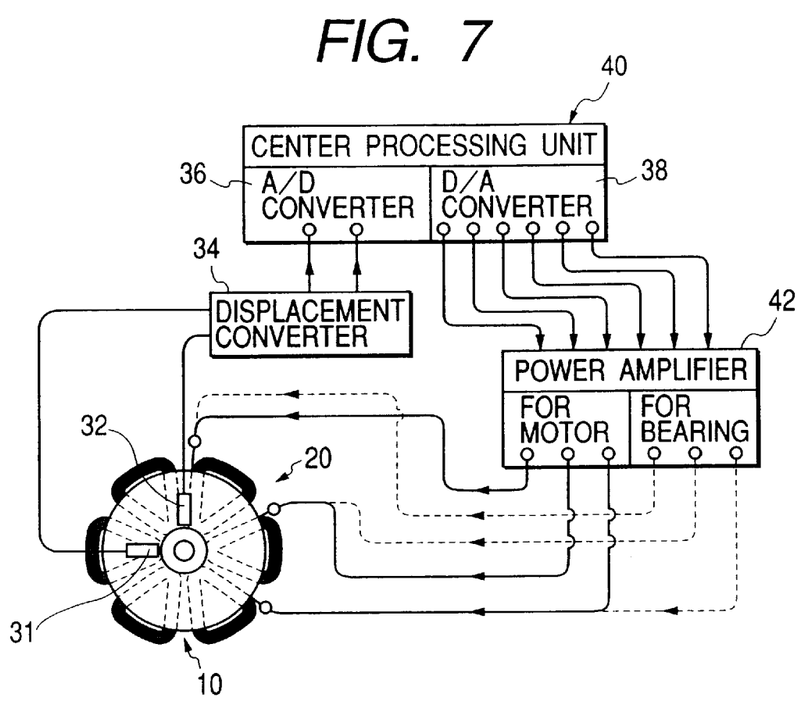
FIG. 7 is a block diagram showing a control system incorporating the motor.

In the magnetic levitated motor described above, its rotation and levitational force may be controlled by use of a control system as shown in FIG. 7. In the figure, the magnetic levitated motor includes displacement sensors 31 and 32 for detecting a displacement of the face of the rotor 10, which is perpendicular to the rotational-axis direction of the rotor, in addition to the sensors for ordinary rotor controls. The displacement sensor 31 senses a displacement of the rotor in the x-direction, and the displacement sensor 32 senses a displacement of the rotor in the y-direction, which is orthogonal to the x-direction. Signals that are output from the displacement sensors 31 and 32 are input to a displacement converter 34; its output signals are input to an analog to digital (A/D) converter 36 where those signals are digitized; and the resultant digital signals are input to a control unit (referred to as CPU) 40. Upon receipt of the sensor signal from the displacement sensors 31 and 32, the CPU 40 outputs a control signal for controlling a current fed to the bearing coil set 27, through a digital to analog (D/A) converter 38. The control signal is applied to a power amplifier 42, and then the power amplifier 42 outputs currents, which depends on the control signal, to the bearing coil set 27. The current fed to the bearing coil set 27 is thus controlled, so that the rotary shaft of the rotor 10 is held at a predetermined angular position.

A conventional control method may be employed for the rotation control applied to the rotor driving coil set 26. In the method, pole position sensors and the like are provided as in the normal motor control, whereby the motor rotation control is performed.

Figure 8:
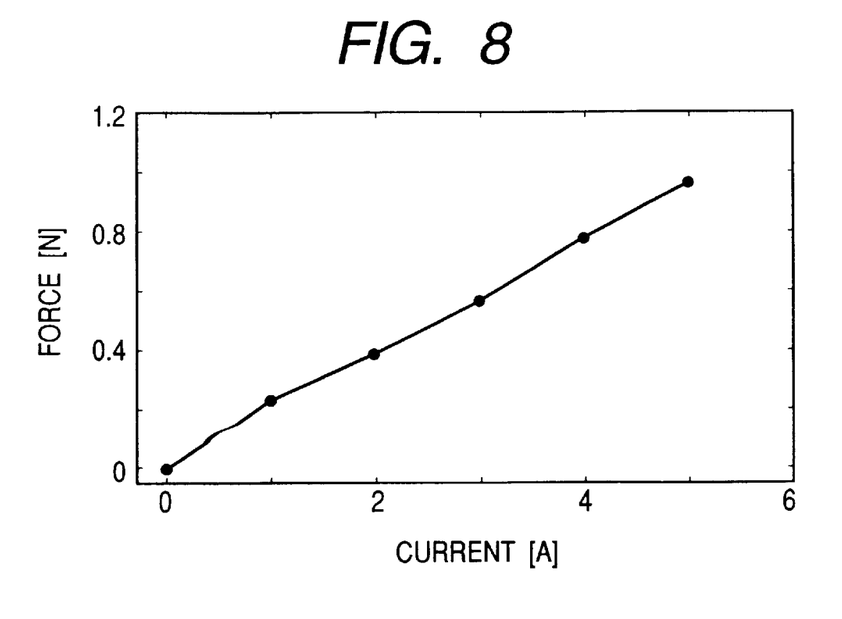
FIG. 8 is a graph showing a current vs. levitational force characteristic of the magnetic levitated motor of the embodiment.

To check the levitation/rotation characteristic of the magnetic levitated motor of the invention, the levitational force and rotational torque were measured. The result of measuring the levitational force with respect to the current is shown in FIG. 8. The levitational force measurement was conducted in the following conditions. Such a motoring current as not to rotate the motor was fed to the stator coils, and the motor speed was set at 0 rpm. In this state, the rotor angle was fixed and the levitational current was increased from 1A to 5A in the steps of 1A. As seen from FIG. 8, the levitational force substantially linearly varies with respect to the current. And it was found that the levitational force is generated free from the influence of the rotational angle of the rotor. In other words, it was found that the levitational force is produced independently of the rotational angle of the rotor, while exhibiting linear variation.

Figure 9:
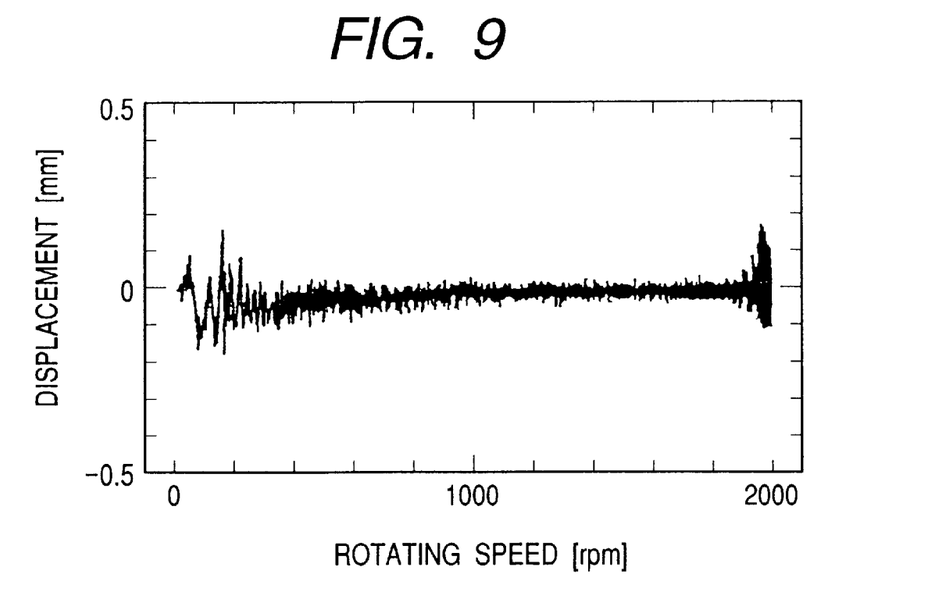
FIG. 9 is a graph showing a characteristic of a rotating speed vs. rotor displacement in the x-direction.
Figure 10:
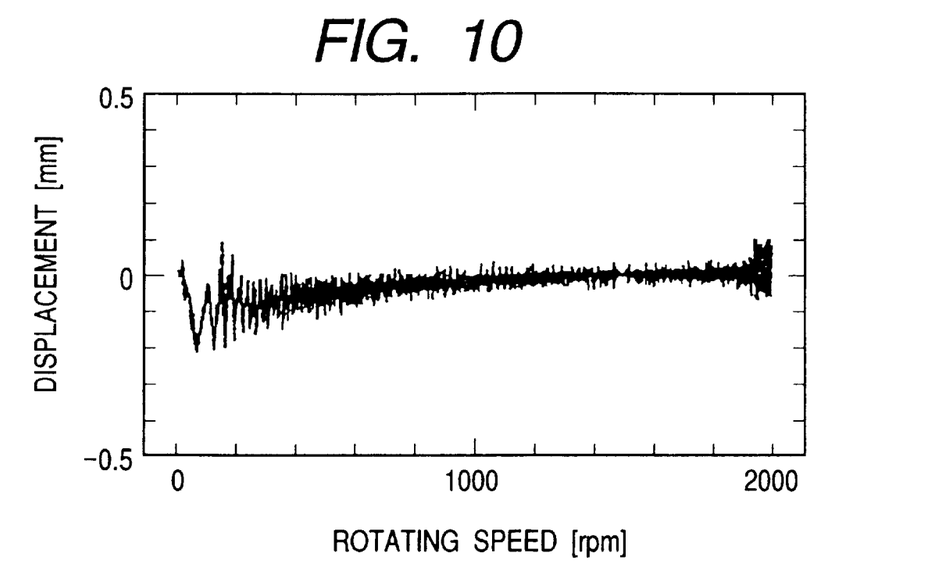
FIG. 10 is a graph showing a characteristic of a rotating speed vs. rotor displacement in the y-direction.

FIGS. 9 and 10 graphically represent the results of measuring displacements of the rotor in the radial direction under the levitation control. FIG. 9 shows an X-direction response characteristic with respect to the rotating speed, and FIG. 10 shows a Y-direction response characteristic with respect to the same. Those graphs show that the x- and y-direction controls can effectively be carried out even if the rotating speed varies.

Figure 11:
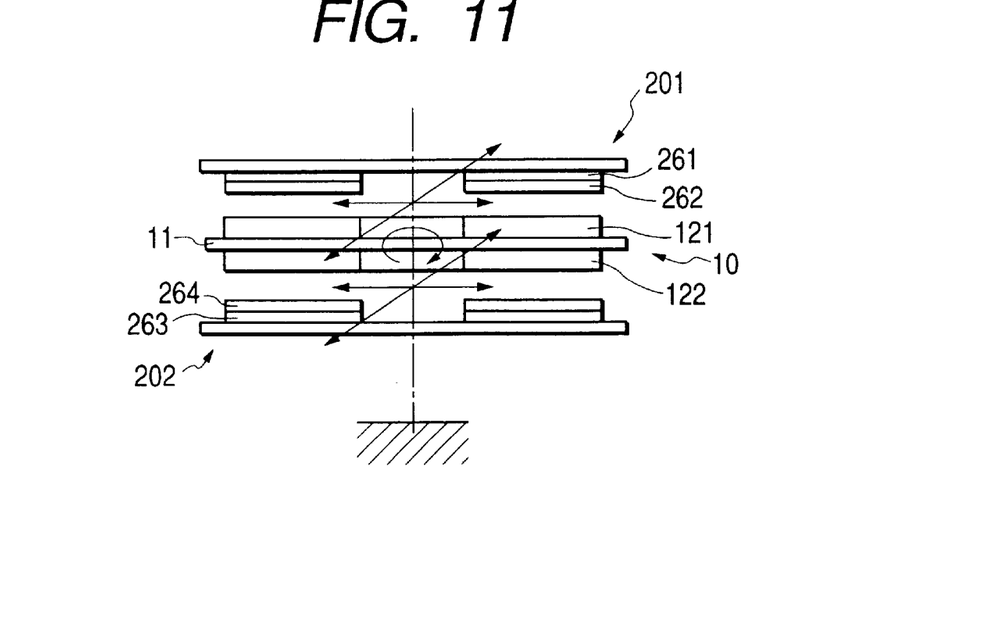
FIG. 11 is a front view showing a magnetic levitated motor according to a second embodiment of the invention.

In the magnetic levitated motor of the embodiment mentioned above, one stator faces at its face to one rotor. The present invention is not limited to the above configuration. For example, a magnetic levitated motor according to a second embodiment is shown in FIG. 11. The stators and the rotors are arranged such that those face at their faces. Specifically, two planer rotor magnets 121 and 122 are disposed on both sides of a back yoke 11 constituting a rotor 10, as viewed in the rotational axis of the yoke. Stators 201 and 202 are disposed in a state that the couple of the planer rotor magnets 121 and 122 is located between those stators. Further, a bearing coil set 261 and a rotary coil set 262 are mounted on the stator 201, and a bearing coil set 263 and a rotary coil set 264 are mounted on the stator 202. The thus constructed magnetic levitated motor is equivalent to the combination of two motors. In this structure, the rotational torque of the motor may be increased by using the push-pull method. The 4 degrees of freedom in the radial direction may actively be controlled through a radial directional control, which is performed at two separated positions.

Figure 12:
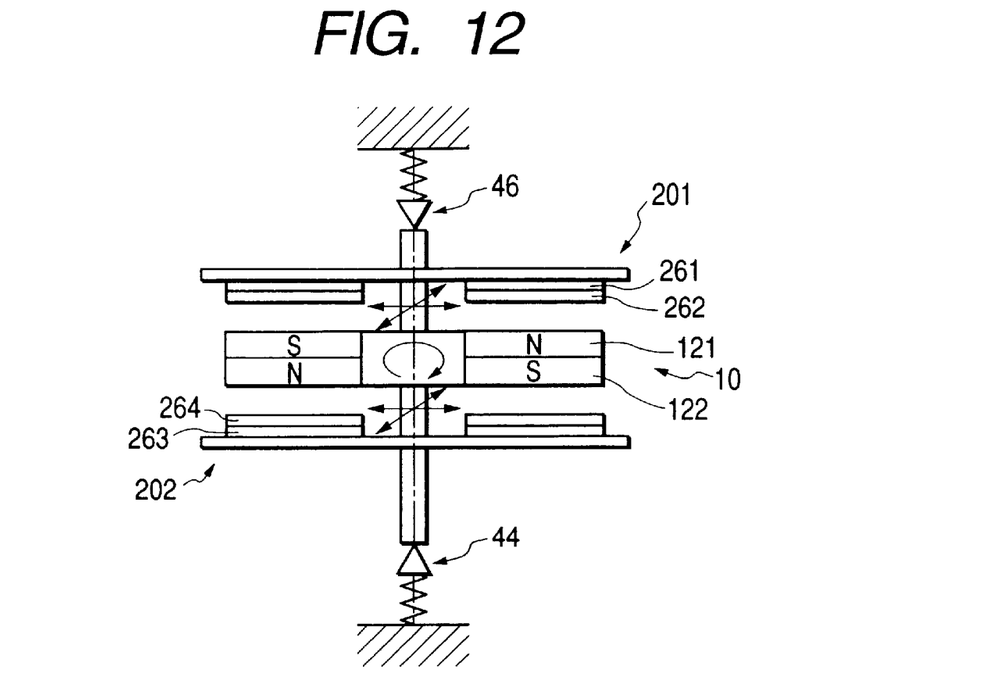
FIG. 12 is a front view showing a magnetic levitated motor according to a third embodiment of the invention.

A magnetic levitated motor according to a third embodiment is shown in FIG. 12. In the illustrated motor, the planer rotor magnets 121 and 122, which are located on both sides of what forms the rotor in FIG. 11, are arranged so as to have magnetic polarities being opposite to each other. The back yoke 11 of the rotor 10 in the FIG. 11 embodiment is omitted. The two planer rotor magnets 121 and 122 are laid one on the other. The thus constructed magnetic levitated motor produces useful effects comparable with those of the second embodiment. Further, no back yoke is needed, so that the rotor is advantageously reduced in weight.

The magnetic levitated motors of the second and third embodiments may perform various types of controls by controlling the currents fed to the rotor driving coil set and bearing coil set. Examples of the controls are displacement controls of the rotor in the x- and y-directions, four axes control of controlling inclinations of the x- and y-planes of the rotor, and rotational torque control.

The rotor may support a thrust load by use of a proper thrust bearing member. An example of such is illustrated in FIG. 12. In the example, a shaft is protruded from the center of the top and bottom of the rotor 10. The shaft of the rotor is pivotally supported at the top and bottom thereof by pivots 44 and 46. Alternatively, the rotor 10 is rotatably supported in a non-contact manner by the thrust magnetic bearing member.

Figure 13:
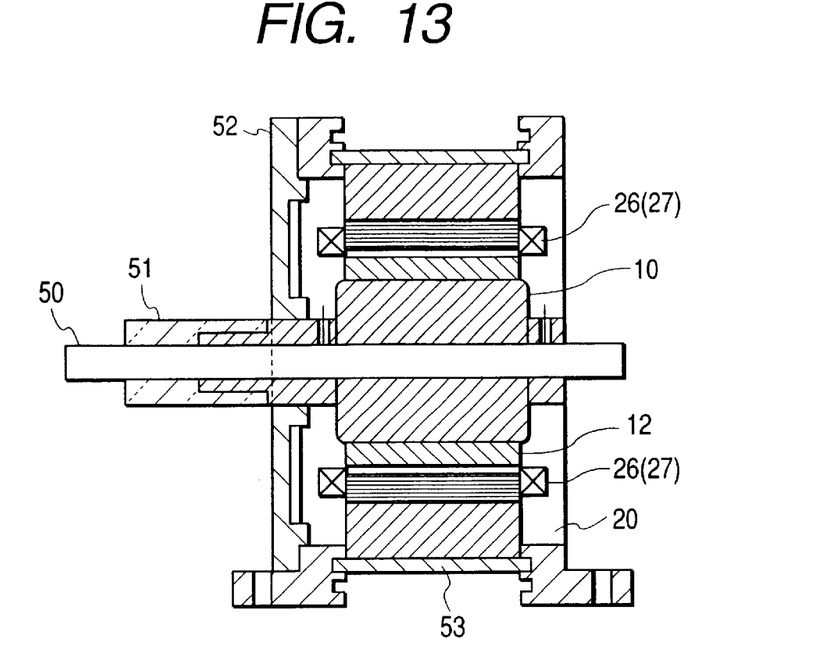
FIG. 13 is a longitudinal sectional view showing a magnetic levitated motor according to a fourth embodiment of the invention.
Figure 14:
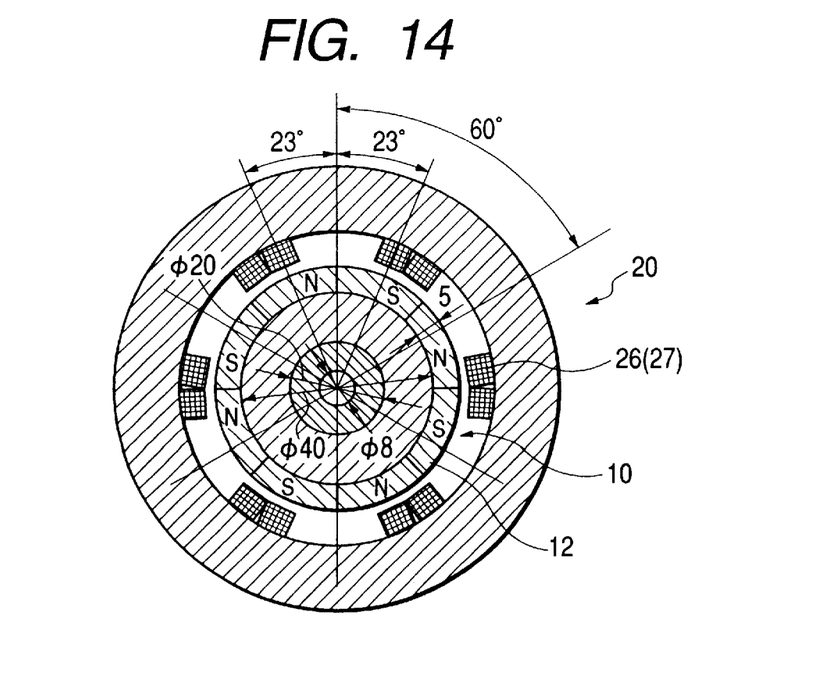
FIG. 14 is a transverse sectional view of the motor shown in FIG. 13.

FIGS. 13 and 14 show a magnetic levitated motor according to a fourth embodiment of the present invention. In the embodiment, the rotational torque and levitational force generation control principle of the invention is applied to the rotor magnet and the stator coil configured as a cylinder type (circumferential confronting type).

Difference of this cylinder type rotor magnet from the face confronting type rotor magnet is that the former merely takes a cylinder-like configuration. The magnetic poles of the rotor magnet 12 and the stator coils of the cylinder type rotor magnet are arranged so that the positional relationships therebetween are substantially the same as of the face confronting type rotor magnet. Six stator coils 26 and 27 are circumferentially arrayed at spatial intervals of $\pi/3$ in connection with the rotor magnet 12 having eight magnetic poles. The going and returning wires of each phase coil, i.e., the coil portions axially extending and intersecting the magnet, are spaced π/4 so as to generate a maximum torque.

Thus, by arranging the magnetic poles of the rotor magnet and the stator coils as in the face confronting type rotor magnet, the rotational torque and the levitational force may be controlled independently. In FIGS. 13 and 14, reference numeral 52 designates a support plate. An auxiliary cylinder 53 is held with the support plate 52. A stator 20 is fixedly mounted on the inner side of the auxiliary cylinder 53. A center hole is formed in the support plate 52. A rotary shaft 50 of the rotor 10 is protruded out through the center hole of the support plate. A detected member 51 for detecting the rotation center position of the rotor 10 is fastened to the rotary shaft 50. The rotor 10, rotary shaft 50 and detected member 51 may rotate while not contacting with other member or members in a manner that the position of the detected member 51 is detected by use of the two displacement sensors 31 and 32 for detecting a displacement of the rotor as in the already stated embodiment.

Figure 15:
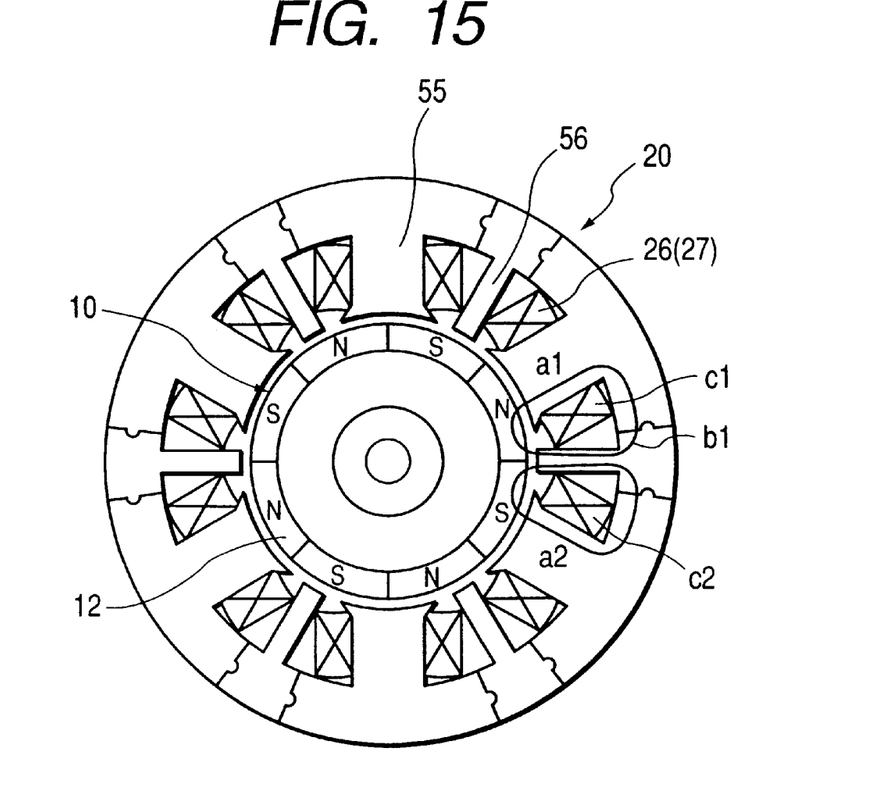
FIG. 15 is a front view showing a magnetic levitated motor according to a fifth embodiment of the invention.

A magnetic levitated motor according to a fifth embodiment of the invention is shown in FIG. 15. In this embodiment, in the construction of the fourth embodiment, the stator 20 additionally includes salient poles 55 and 56 for effectively utilizing the magnetic flux developed from the stator coils. The salient poles 55 are provided as main poles. The coils 26 and 27 are together or separately wound on the main poles. The salient poles 56 are provided as auxiliary poles and located one between the adjacent main poles. The main and auxiliary poles 55 and 56 are circumferentially arranged at the coil intervals referred to in connection with FIGS. 5 and 6; the width of each main pole 55 is approximately π/4 and the width of each auxiliary pole 56 is approximately π/12. Therefore, a gap between the rotor and the stator may be reduced to be small while keeping the magnetic relationship shown in FIGS. 5 and 6. Accordingly, more intensive rotational force is secured.

Figure 16:
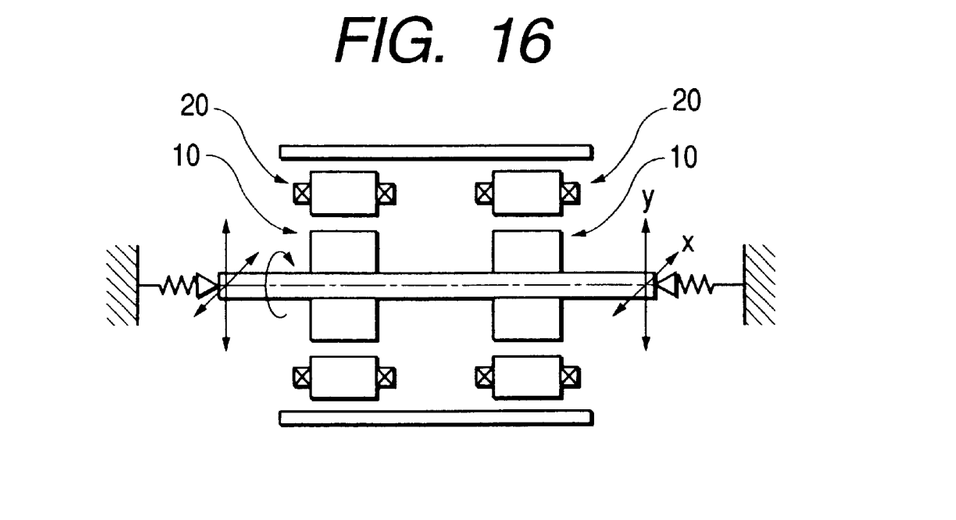
FIG. 16 is a front view showing a magnetic levitated motor according to a sixth embodiment of the invention.

FIG. 16 shows a magnetic levitated motor according to a sixth embodiment of the invention. This embodiment corresponds to the combination of two cylinder type motors arrayed in the axial direction. This embodiment is capable of performing a displacement control in the x-direction, which is perpendicular to the rotary shaft of the rotor 10, a displacement control in the y-direction, which is perpendicular to the rotary shaft of the rotor 10 and at a right angle to the x-direction, a four-axes control for the inclination of the x- and y-planes, and a rotational torque control. The rotor 10 may support a thrust load by use of a proper thrust bearing member. For example it may be pivotally supported by use of pivots. Alternatively, the rotor 10 is rotatably supported in a non-contact manner by use of the thrust magnetic bearing member.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A magnetic levitated motor comprising:
   at least one rotor provided with a rotor magnet magnetized so as to have eight magnetic poles;
   at least one stator confronted with the rotor while rotatably supporting the rotor with magnetic force, the stator provided with rotor driving coils confronted with the rotor magnet to generate a rotational torque in the rotor to rotate the rotor, and six bearing coils for generating a bearing force in a direction perpendicular to the rotational axis of the rotor; and
   a displacement sensor for detecting displacement of the rotor with respect to a plane which is perpendicular to the rotational axis of the rotor,
   wherein currents flowing in the bearing coils are controlled in accordance with output of the displacement sensor to keep the rotational axis of the rotor at a predetermined position.

2. The motor as set forth in claim 1, wherein the stator and rotor are arranged so as to constitute a planar confronting type motor.

3. The motor as set forth in claim 2, wherein two stators are provided such that two planar rotor magnets are arranged along the rotational axis thereof in between.

4. The motor as set forth in claim 3, wherein six rotor driving coils respectively having a shape identical with the bearing coils are disposed at the same locations where the six bearing coils are disposed.

5. The motor as set forth in claim 1, wherein the stator and rotor are arranged so as to constitute a cylindrical confronting type motor.

6. The motor as set forth in claim 5, wherein a pair of cylindrical rotor-stator sets are arranged along a common rotational axis of the rotors.

7. The motor as set forth in claim 5, wherein the stator is provided with salient poles so as to situate between the respective adjacent rotor driving coils and bearing coils.

8. The motor as set forth in claim 1, wherein six rotor driving coils respectively having a shape identical with the bearing coils are disposed at the same locations where the six bearing coils are disposed.

9. The motor as set forth in claim 8, wherein the rotor driving coils and the bearing coils are circularly arranged on the stator with a spatial interval of π/3 while occupying a region of π/4 of the circle, respectively.

10. The motor as set forth in claim 8, wherein the rotor driving coils and the bearing coils are formed by a common wire in which current for generating the rotational torque and current for generating the bearing force flow in a superposed manner.

11. A magnetic levitated motor comprising:
    at least one rotor provided with a rotor magnet magnetized so as to have eight magnetic poles;
    at least one stator confronted with the rotor while rotatably supporting the rotor with magnetic force, the stator provided with six rotor driving coils confronted with the rotor magnet to generate a rotational torque in the rotor to rotate the rotor, and six bearing coils for generating a bearing force in a direction perpendicular to the rotational axis of the rotor; and
    a displacement sensor for detecting displacement of the rotor with respect to a plane which is perpendicular to the rotational axis of the rotor,
    wherein currents for generating a bearing force in a direction parallel with the plane flowing in the rotor driving coils in a superposed manner are controlled in accordance with output of the displacement sensor to keep the rotor at a predetermined position in the plane.

12. The motor as set forth in claim 11, wherein the six rotor driving coils are circularly arranged on the stator with a fixed interval; and wherein currents for generating the bearing force acting the radial direction of the circle are applied to at least a pair of the rotary coils situated on a diameter of the circle in order to control the displacement of the rotor in the radial direction.

13. The motor as set forth in claim 12, wherein currents having same phase are applied to at least a pair of the rotary coils situated on the diameter of the circle in order to generate a rotational torque in the rotor.

14. The motor as set forth in claim 13, wherein the stator and rotor are arranged so as to constitute a planar confronting type motor; and wherein two stators are provided such that two planar rotor magnets are arranged along the rotational axis thereof in between.

15. The motor as set forth in claim 13, wherein the stator and rotor are arranged so as to constitute a cylindrical confronting type motor; and wherein a pair of cylindrical rotor-stator sets are arranged along a common rotational axis of the rotors.

* * * * *